March 16, 1926.
O. LASCHE ET AL
1,576,916
OVEN FOR THE DISTILLATION OF SOLID MATERIAL
Original Filed Nov. 15, 1923
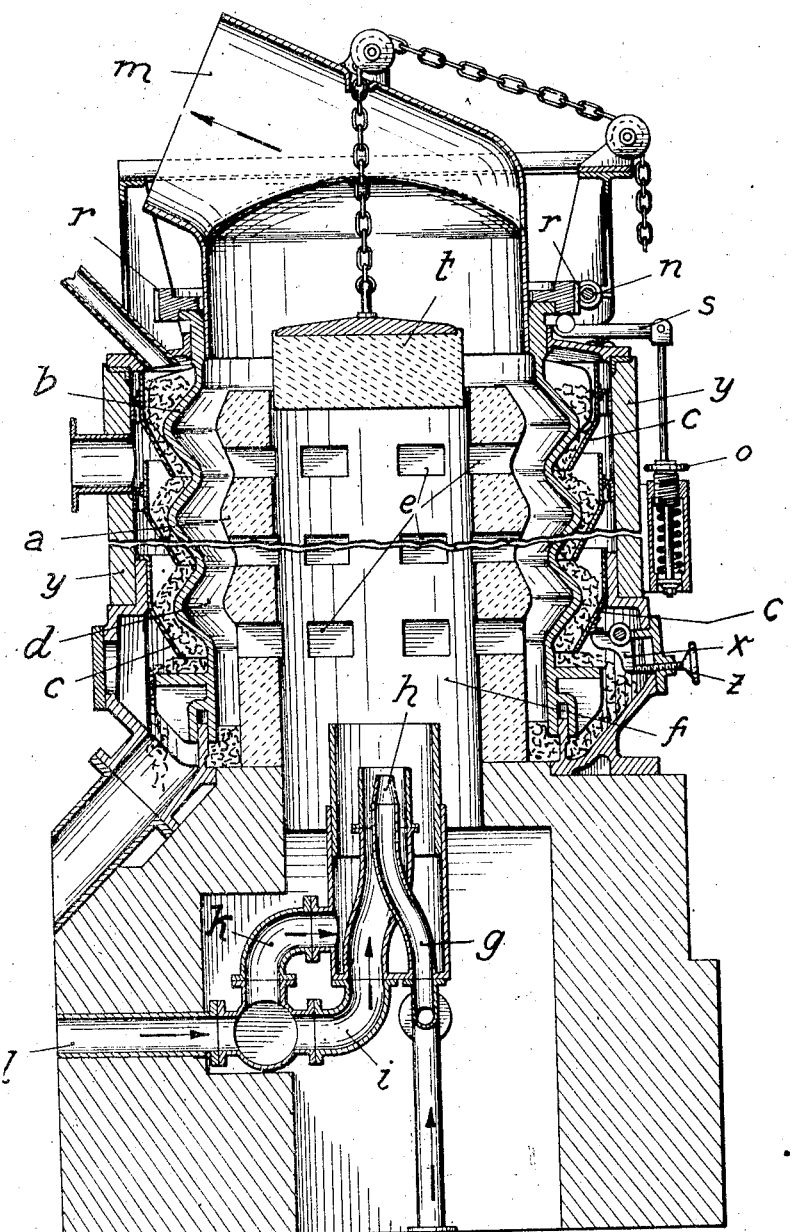
Inventors:
Oskar Lasche (deceased)
and
Carl Geissen
by (signature)
Atty.

Patented Mar. 16, 1926.

1,576,916

UNITED STATES PATENT OFFICE.

OSKAR LASCHE, DECEASED, LATE OF BERLIN-CHARLOTTENBURG, GERMANY; BY FRITZ LASCHE, EXECUTOR, OF DRESDEN, GERMANY, AND CARL GEISSEN, OF BERLIN-SCHONEBERG, GERMANY, ASSIGNORS TO KOHLENVEREDLUNG G. M. B. H., OF BERLIN, GERMANY, A FIRM.

OVEN FOR THE DISTILLATION OF SOLID MATERIAL.

Original application filed November 15, 1923, Serial No. 675,022. Divided and this application filed March 6, 1925. Serial No. 13,666.

*To all whom it may concern:*

Be it known that OSKAR LASCHE, deceased, formerly a resident of Berlin-Charlottenburg, Germany, and CARL GEISSEN, residing at Berlin-Schoneberg, Germany, both of them citizens of the German Empire, have made an invention relating to an Improvement in Ovens for the Distillation of Solid Material (for which we have filed application in Germany, October 5, 1922), of which the following is a specification.

Our invention relates to the distillation of bituminous material, more especially bituminous fuel. Its particular object is to effect distillation of such materials in a more economical and efficient manner than has hitherto been possible.

In order to expel the volatile constituents from solid material such as bituminous fuel, the material must be exposed to a constant temperature not exceeding a predetermined limit, care being taken not to overheat the material nor the volatile matter expelled therefrom. On the other hand, the degree of utilization of the heat energy available for the heating of the material plays a decisive rôle in the economy of the distillation process.

In the distillation of bituminous and other solid material, as hitherto practiced, direct heating was excluded as entailing irregular variations of temperature and other serious drawbacks. On the other hand, the indirect heating resorted to results in a very poor transmission of heat from the heating gases to the material to be treated across the intervening partition or wall.

The present invention provides means for ensuring a uniform heating of the material within a predetermined range of temperature, at the same time utilizing the heat energy stored in the heating gases so as to render the process highly economical.

According to this invention the material to be heated, and which is preferably caused to move in a comparatively thin layer, is exposed simultaneously to the direct action of the heating gases and to the heat emitted by radiation from a large solid mass heated by these same gases. Part of the heat available in the heating gases is thus utilized for heating this mass which at the same time acts as a heat accumulating and equalizing means, cooling the heating gases down to the predetermined temperature required, storing the heat taken up from the gases, rendering the heating of the material to be treated more uniform by gradually and uniformly emitting the heat by radiation, and preventing local overheating of the material and of the volatile constituents liberated therefrom. In a preferred form of our invention we cause the material which shall be subjected to distillation, to travel in a downward direction past and in contact with the outer surface of a hollow cylindrical wall or shell presenting a number of superposed inclined heating surfaces. This wall or shell is heated by means of a gas burner or the like disposed centrally below it and an apertured hollow cylindrical heat storing and equalizing mass is placed above the burner and in the way of the heating gases, a clearance being provided between the heat storing mass and the outer wall or shell so that the heating gases, after having passed through the heat storing and equalizing cylinder and out through the apertures provided therein, come in contact with the inner surface of the cylindrical wall or shell across which their heat together with the heat emitted from the heat storing cylinder by radiation is transmitted to the material traveling past and in contact therewith. Means can be provided for varying the area of the heat storing mass exposed to the action of the flame, thereby regulating the temperature of the flame as well as the quantity of heat energy accumulated for radiation. In this manner all danger of overheating the solid material or the distillation products is avoided. The heating gases can enter the oven with a far higher temperature than was hitherto possible, the heat storing and equalizing mass providing for the necessary cooling down and for the equalizing without any appreciable loss of their heat energy.

This application is a division of copending application Serial No. 675,022, filed November 15, 1923 for "distillation of bituminous materials" by Oskar Lasche, (deceased), by Fritz Lasche (executor), and Carl Geissen.

In the drawings affixed to this specification and forming part thereof an oven adapted for carrying our invention into practice is illustrated diagrammatically in vertical section by way of example.

Referring to the drawings, the oven substantially comprises a hollow cylinder $a$ of refractory material having a wavy outer surface, this cylinder forming the heat accumulator and equalizer. This cylinder is surrounded by a cylindrical transversely corrugated shell $b$ which may consist of cast iron and the outer surface of which serves as a support for the material to be distilled. The cylindrical heating surface thus provided is subdivided in a plurality of superposed annular zones. These zones are formed by funnel sections $c$ which cause the material to be treated to slide down in the annular space confined between the funnels $c$ and the cylinder $b$. This latter cylinder is arranged to revolve or to execute a rotary pendulum motion relatively to the outer funnels. $y$ is an outer jacket surrounding the guide funnels $c$ and spaced therefrom.

We may however also employ a stationary heating cylinder and movable guide funnels. In order that the relative motion of the cylinder $b$ and guide funnels $c$ be accompanied by a grinding action, we may arrange the axis of rotation of the two systems of conical surfaces eccentrically with regard to each other. The cylinder $b$ is made to revolve by a worm $n$ acting on a helically toothed rim $r$ mounted on the top edge of the cylinder $b$. The cylinder $b$ can be adjusted axially by means of a double-armed lever $s$ operated by a hand wheel $o$ acting from below on the toothed rim $r$. A hand wheel and spindle $z$ are provided for actuating a double-armed lever $x$ acting on the lowermost guide funnel $c$ from below so as to displace it in axial direction.

A sliding cover $t$ of refractory material is mounted axially above the refractory cylinder $a$ and means are provided for lowering this cover into the hollow of the cylinder, thereby reducing according to requirements the area acted on by the heating gases. The annular space $d$ confined between the outer cylinder $b$ and the inner cylinder $a$ communicates with the interior of the cylinder $a$ by means of ports $e$. Into the cylinder $a$ there is supplied heating gas through the gas pipe $g$, this gas being burnt in the burner $h$. An air pipe $i$ serves for supplying the air of combustion, the quantity of which can be controlled by suitable means (not shown). In order to regulate the temperature of the heating gas according to requirements, a branch pipe $k$ comprising controlling means (not shown) is connected with the main air pipe $l$ and serves for supplying the furnace with the required quantity of secondary air. The heating gases after having given off their heat escape through the chimney $m$.

The operation of the furnace is the following:—the heating gases form a narrow flame extending into the interior $f$ of the furnace and are mixed with the secondary air supplied through the branch pipe $k$. The heating gases first heat the inner cylinder from within and thereafter pass through the ports $e$ into the annular space $d$ before escaping through the chimney $m$, being eventually further utilized in suitable heat exchange devices, for instance in a device for the preliminary drying of the material to be distilled. On their way to the chimney the heating gases heat the cylinder $a$ from without and cylinder $b$ from within. Consequently, the heating surface is heated not only by direct contact of the heating gases with its inner surface, but also by the heat emitted by radiation from the cylinder $a$. In order to render the heating of the inner cylinder as efficient as possible, the ports $e$ may be arranged at the lower end of the cylinder $a$ near the burner, whereby the flame is caused to extend more or less into the inner space $f$ according to the position of the sliding cover $t$ and is compelled to change its direction in the cylinder and in the annular space $d$. Obviously, the heating gases may also be conducted in a different manner without in any way altering the result. We may, for instance, cause the heating gases to enter at the bottom of the interior of the cylinder $a$, to rise in the inner space, to descend again in the annular space between cylinder $a$ and heating surface $b$ and to escape near the bottom of the shell.

We wish it to be understood that we do not desire to be limited to the exact details of construction shown and described, for obvious modifications will occur to a person skilled in the art.

We claim:—

1. Oven for the distillation of solid material, comprising a cylindrical shell, a thick-walled apertured hollow body of refractory material within, but spaced from said shell and heating gas supplying means arranged axially of said hollow body.

2. Oven for the distillation of solid material, comprising a transversely corrugated shell, a thick-walled hollow body of refractory material within, but spaced from said shell, heating gas supplying means arranged axially of said hollow body and means surrounding said shell for guiding the material to be treated in contact with said shell.

3. Oven for the distillation of solid material, comprising a transversely corrugated shell, a thick-walled hollow body of refractory material within, but spaced from said shell, heating gas supplying means arranged axially of said hollow body, means surrounding said shell for guiding the material to be treated in contact with said shell and a jacket surrounding said guiding means and spaced apart therefrom.

4. Oven for the distillation of solid material, comprising a shell, a thick-walled hollow body of refractory material within, but spaced from said shell, means displaceable within said body for varying the free inner area of said body, heating gas supplying means arranged axially of said hollow body and means for guiding the material to be treated in contact with the outer surface of said shell.

5. Oven for the distillation of solid material, comprising a shell, a thick-walled hollow body of refractory material within, but spaced from said shell, a cover of refactory material axially displaceable within said body, heating gas supplying means arranged axially of said hollow body and means for guiding the material to be treated in contact with the outer surface of said shell.

In testimony whereof we affix our signatures.

FRITZ LASCHE,
*Executor of the Estate of Oskar Lasche, Deceased.*

CARL GEISSEN.